Feb. 2, 1971   V. G. ANDERSON   3,560,296
METHOD FOR PREPARING 3-DIMENSIONAL PICTURES
Filed Aug. 11, 1967   2 Sheets-Sheet 1

INVENTOR.
VICTOR G. ANDERSON
BY
Brumbaugh, Free, Graves & Donohue
his ATTORNEYS

Feb. 2, 1971  V. G. ANDERSON  3,560,296
METHOD FOR PREPARING 3-DIMENSIONAL PICTURES
Filed Aug. 11, 1967  2 Sheets-Sheet 2

INVENTOR.
VICTOR G. ANDERSON
BY
Brumbaugh, Free, Graves & Donohue
his ATTORNEYS

3,560,296
METHOD FOR PREPARING 3-DIMENSIONAL PICTURES

Victor G. Anderson, Rowayton, Conn., assignor to Victor Anderson 3-D Studios Inc., Mamaroneck, N.Y., a corporation of New York
Filed Aug. 11, 1967, Ser. No. 660,086
Int. Cl. C09j 5/02; B32b 31/00
U.S. Cl. 156—308                                      2 Claims

ABSTRACT OF THE DISCLOSURE

In the illustrative embodiment of the invention described herein, three dimensional color pictures are prepared by taking a succession of original pictures of an object at different viewing angles with a motion picture camera to provide a film strip. A set of at least three color separation negatives is then made by successively projecting a different primary component of the film strip, frame by frame, onto each of a corresponding number of photosensitive films through a lenticular screen which functions to individualize each frame exposure and, at the same time, causing relative movement between the lenticular screen and the exposed photosensitive film. After the photosensitive films are developed to provide color separation negatives, combined positive color prints are prepared from the separation negatives by graphic art methods. Thereafter, each color print is laminated in registered relation onto a lenticular screen produced in the same manner as the lenticular screen through which the frames of the film strip were projected.

BACKGROUND OF THE INVENTION

This invention relates to methods and apparatus for preparing stereoscopic pictures and, more particularly, to methods and apparatus for preparing color pictures which exhibit stereoscopic relief when viewed through a resolving screen.

The basic method for the production of stereoscopic pictures in either color or black-and-white is to dispose a lenticular screen or a black line screen between the lens of a camera and the sensitized film of the camera and then causing relative movement between the object being photographed and the camera. The lenticular screen images on the film a composite picture containing parallel panel views of the object as seen from a plurality of points of view. When the composite image, either negative or positive, is viewed through a second black line screen or lenticular screen, an illusion of stereoscopic relief is obtained.

One form of stereoscopic picture comprises a lenticular screen affixed by means of a separate adhesive to a composite print. In regard to this particular form, substantial difficulty has been encountered in the production thereof. It can be seen that it is absolutely necessary to maintain optical registration between the lenticules of the screen and the panels or lineations of the composite print in order to produce a clear and distinct stereoscopic picture. Accordingly, with this form of stereoscopic picture, the adhesive must be applied in such a manner as to permit subsequent adjustment of the screen relative to the composite print in order to maintain exact alignment between the screen and the composite print. Because of the adjustment required, such production systems have been characterized by individual picture assembly as opposed to mass produced picture assemblies. Still another problem encountered in the production of this type stereoscopic picture is the non-uniformity of the adhesive extending between the lenticular screen and the composite print.

SUMMARY OF THE INVENTION

Accordingly, it is an object of the present invention to provide a method for preparing stereoscopic color pictures which are clear and distinct and which overcomes the above-mentioned disadvantages of the prior art system.

It is another object of the present invention to provide a method for preparing a stereoscopic picture wherein optical registration is maintained between each composite image and a matched lenticular screen.

It is still another object of the present invention to provide a method for preparing stereoscopic pictures which is characterized by mass production techniques.

These and other objects of the invention are accomplished by exposing the film segments of a color film strip to an object field at different viewing angles in order to provide sufficient information to produce a stereoscopic picture. Further steps are exposing the color separation negative film to different color components of the film strip, frame by frame, through a lenticular screen which functions to individualize each segment exposure and, at the same time, causing relative movement between the negatives and the lenticular screen. A color print is then made from the separation negatives by graphic arts methods and the composite color positive print is thereupon laminated onto the back of a lenticular screen surface.

In a particular embodiment of the invention, a black line screen is selectively placed in front of the lenticular screen through which the color separation negatives are exposed to improve the optical resolution of the lenticulars by aperturing each lenticular lens. With respect to the step of laminating the color print onto the back of the production lenticular screen, a modified flat bed press is employed. A solvent for the lenticular screen material is applied to the back of the production screen to render the screen adhesive, after which the composite print is rolled onto the screen under pressure. This securely laminates the lenticular screen-positive print combination.

DESCRIPTION OF THE PREFERRED EMBODIMENT

Figure 1:
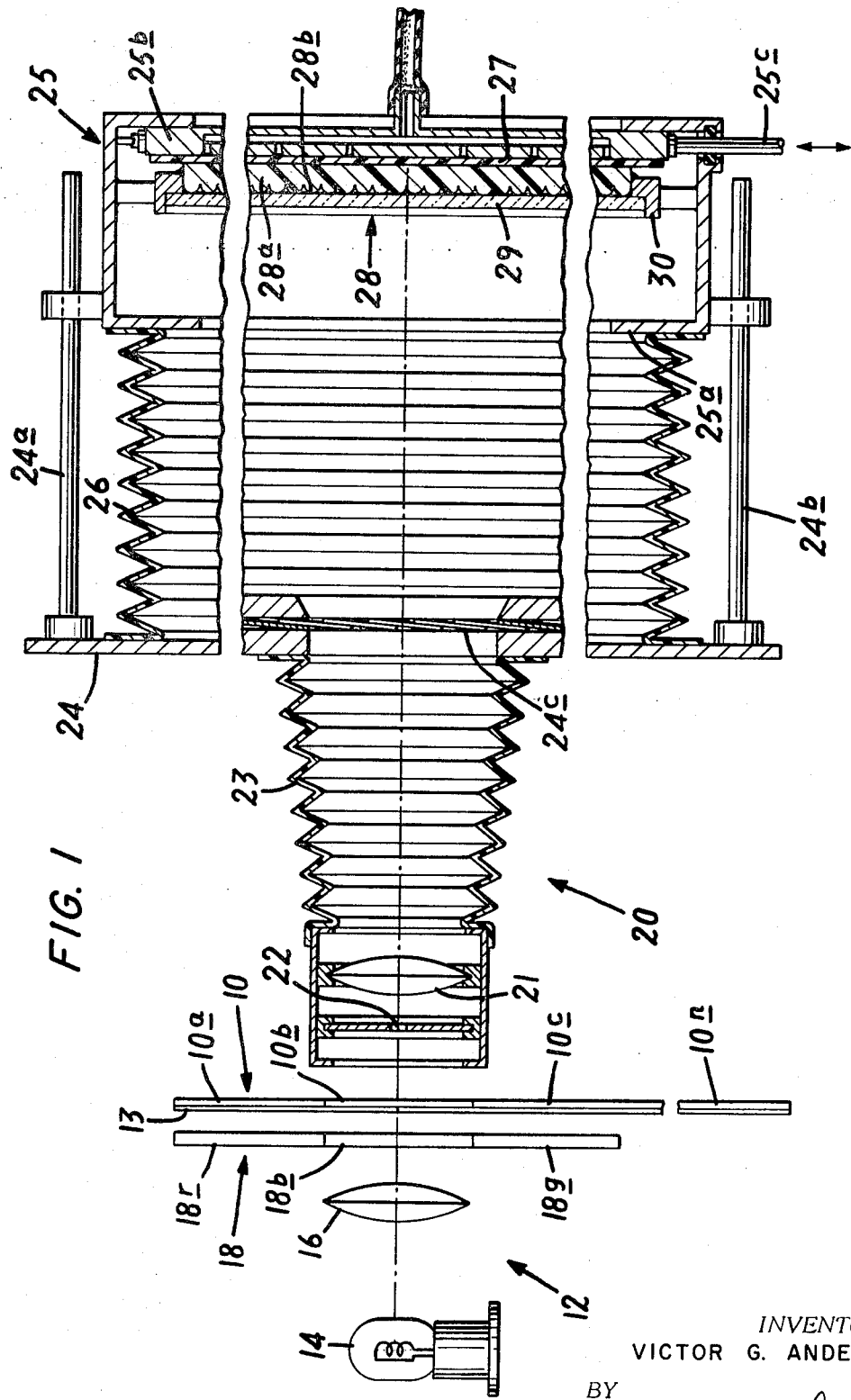
FIG. 1 is a schematic diagram of an illustrative projector system for assembling color transparencies on a single sheet of film arranged according to the present invention.

In a representative system for assembling color transparencies on a single sheet of film, as shown in FIG. 1, a 35 mm. color transparency film strip 10 is mounted on a film holder (not shown) located in a modified motion picture projector 12. Mounted on the back side of the film strip 10 is a mask 13 which may be, for example, a contrast mask or a color correction mask. The 35 mm. color film strip 10 comprises a plurality of color transparencies 10a, 10b, 10c . . . 10n, each color transparency depicting the same object field from a different viewing angle. The sequence of pictures may be prepared in any known and conventional manner as long as the pictorial information contained therein is sufficient to produce a stereoscopic picture. Preferably, for example, the pictures may be produced by taking 35 mm. motion picture film of the object with a 35 mm. motion picture camera which is given a slow continuous lateral movement during the exposure time. Each segment of the film depicts the object from a different viewing angle, the angular displacement between the film segments being dependent upon the number of pictures taken each second by the camera and the speed at which the camera is driven laterally. The exposed film strip is then processed in any known and conventional manner to provide the 35 mm. color transparency film strip 10, each color transparency depicting the object from a different viewing angle.

The storage of pictorial information should not be implemented with a camera having a lenticular screen disposed in front of the recording emulsion of the camera. This limits the enlargement of or the reduction of the assembled picture because a different lenticular viewing screen must be employed to suit the change in size. Accordingly, there will be a substantial loss in resolution in the final picture.

The projector 12 includes a light source 14 which illuminates each color transparency of the film strip 10 through a condensing lens 16 and a filter strip 18 interposed between the masked side of the film strip 10 and the condensing lens 16. The transparency 10b is shown aligned with the light source 14 and the lens 16. In order to illuminate each transparency of the film strip 10, the film strip is stepped frame by frame through a fixed film gate (not shown) in any manner well known in the art. The operation is controlled such that each transparency of frame is accurately registered by fixed pin registry and aligned with the light source 14 and the lens 16.

The film strip 10 is placed between the filter strip 18 and a modified camera 20. The filter strip 18 comprises a red filter 18r, a blue filter 18b and a green filter 18g. The blue filter 18b is shown aligned with the illuminated transparency 10b. The filters 18r, 18b and 18g may be conventional and, accordingly, the filter 18r passes only the red components of the light emitted by the source 14, the filter 18b passes only the blue component light and the filter 18g passes only the green component light.

As will be explained hereinbelow, at least three separation negatives, each corresponding to a primary color component of the transparencies 10a . . . 10n, are developed from the film strip 10. Each of the filters is therefore associated with the projection of the entire film strip 10. More particularly, the red filter 18r is placed between the film strip 10 and the condensing lens 16 and each transparency 10a . . . 10n is illuminated with only the red color components of the light emitted by the source 14 being transmitted by the red filter 18r to a first sheet of negative film. Then the blue filter 18b is placed between the film strip 10 and the lens 16 and each transparency is once again illuminated with only the blue color component light being transmitted by the filter 18b through the film strip 18 to another sheet of negative film. Finally, the green filter 18g is interposed between the film strip 10 and the condensing lens 16 and each of the transparencies 10a . . . 10n is again illuminated and projected onto a third sheet of negative film.

The camera 20 includes a camera lens 21 in its forward face which is preferably a high quality projection lens chosen according to the length of the bellows, as will be explained hereinafter. Associated with the lens 21 is an aperture arrangement 22 of any known and conventional type. The camera also includes a bellows 23 extending rearwardly from the lens 21 to a support plate 24. Affixed to the support plate 24 are a pair of stanchions 24a and 24b which slidably receive a film holder 25 and an extension bellows 26 and a shutter 24c of any conventional type which is aligned with the projection lens 21. The opposite ends of the extension bellows are attached to the support plate 24 and to the front wall 25a of the film holder 25. Mounted on the back wall 25b of the film holder 25 and retained thereon by means of a pressure vacuum is a film sheet 27 provided with a photosensitive emulsion on the side of the plate looking toward the camera lens 21. The vacuum back wall 25b is movable in a direction which is transverse to the length of the lenticules of a lenticular screen 28, as will be explained hereinafter, and is discretely driven by a motor (not shown) through a lead screw 25c. The selection of the projection lens 21 is dependent upon the length of the bellows 23 and the extension bellows 26, this distance being the final viewing distance of the picture.

Disposed forwardly of the film sheet 27 within the holder 25 and mounted flush thereagainst is the transparent lenticular screen 28, referred to as the assembly screen, which is held against a black line screen 29. The lenticular screen 28 has a flat rear surface 28a in contact with the film sheet 27 and its forward surface is formed with a plurality of small semi-cylindrical convex ribs or lenticules 28b which are directly adjacent and parallel to each other. The lenticular screen 28 may be formed of any suitable transparent and rigid material which may be, for example, plastic. As is understood in the art, because of the lenticules, the image is resolved into a series of fine lines onto the photosensitive emulsion on the side of the film sheet 27 looking toward the lens 21.

The black line grid 29 is supported in the camera by a fixed holder 30 and comprises a glass sheet having a plurality of parallel opaque lines which oppose the intersections between the lenticules 28b. The inclusion of the black line grid 29 improves the optical resolution of the lenticular screen 28 because only the portions of the lenticules 28b having high resolving power are exposed to the transmitted primary color component light.

To expose the photosensitive film sheet 27 to the red color component of the color transparencies 10a . . . 10n, the filter 18r is placed between the transparencies and the condensing lens 16. The film holder for the film strip 10 is then actuated so that each transparency is successively illuminated. As the frame of the original film strip is illuminated and the primary color image is projected, the vacuum back 25b is moved at right angles to the length of the lenticules 28b of the screen 28 a distance equal to a fraction of the width of one lenticule, this fraction being dependent upon the number of transparencies forming the film strip 10. The effect of the simultaneous motion of the back wall 25b with the projection of each of the transparencies is a succession of instant exposures with the linear components of the projected image moving laterally on the emulsion of the film sheet 27. It is this effect of assembling all the film strip images onto the film sheet 27 in the period of time it takes to move the sheet a distance equal to the width of one lenticule which produces the three-dimensional picture.

After the exposure of the film sheet 27 to the red color component images of the transparencies 10a . . . 10n the sheet is removed and developed. Thereafter, separate photosensitive film sheets are exposed to the blue and green color component images of the transparencies 10a . . . 10n in the manner described above, removed from the holder 25 and developed. It is noteworthy that the above method of color separation provides extremely accurate separation negatives because each transparency of the film strip 10 is separated into its three primary color components and each color is highlighted by use of the mask 13 secured to the film strip. Consequently no fineness of detail for the various colors is lost as is the case where a complete color image is photographed through a lenticular screen. Furthermore, if desired, posterizing techniques may be utilized while producing the separation negatives without interferring with the accuracy and three-dimensional impression of the final print. In addition, photographic superimposition of a three-dimensional image on a second three-dimensional image may be accomplished more readily than with other processes for making three-dimensional pictures. It should also be noted that the process of the present invention permits laboratory control of the viewing distance of the final three-dimensional print, and the image may be scaled up or scaled down and can be matched with any lenticular screen configuration without loss of quality or resolution.

From each of the separation negatives, combined positive prints are made by a suitable graphic arts process, as is understood in the art. For the offset lithography process, the separation negatives are each exposed through a contact halftone screen to give a screen positive from which three offset plates are made. Because of the high degree of detail, it is necessary to use a high quality contact halftone screen, such as, for example, a three hundred line screen. Moreover, during the exposure through the halftone screen, the separation negative is placed in contact, emulsion to emulsion, wth the unexposed film. It has been found that by placing the separation negative in direct contact with the unexposed film and placing the halftone screen on the base side of the negative there is a tendency to shape the dots to produce fine sharp lines. The three offset plates made from the screen positives are then printed one at a time, superimposed in register and in the proper color on a sheet formed of suitable material such as, for example, paper or plastic, to thereby provide a combined or composite color print, as is understood in the art. Moreover, during the above processes of forming the screen positives and printing the composite color prints, a fixed pin registration is maintained between the resultant color print and the separation negatives.

Figure 2:
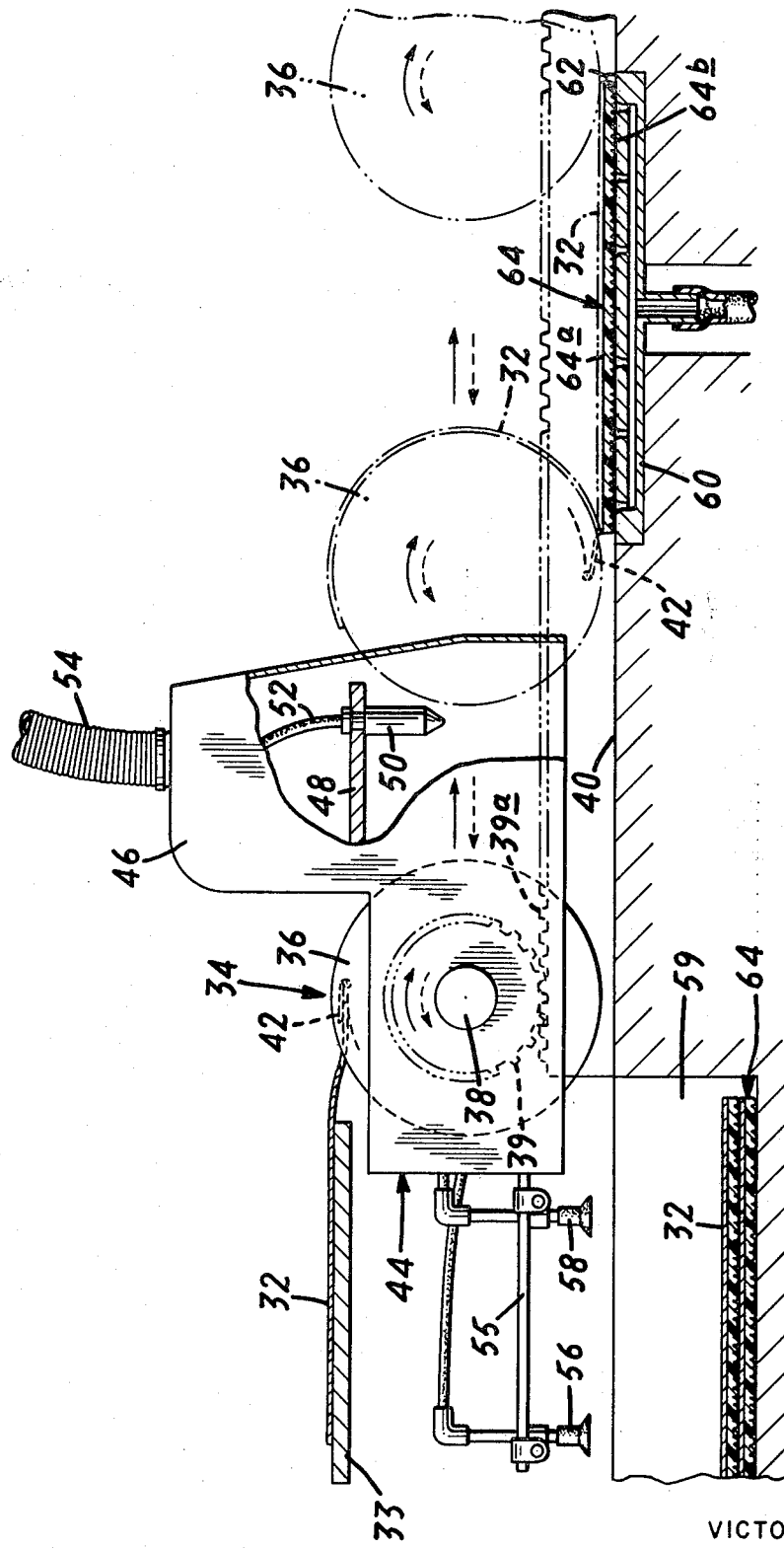
FIG. 2 is a schematic diagram of an illustrative system for laminating a composite color print onto a lenticular screen arranged according to the present invention.

Referring to FIG. 2, there is shown apparatus for laminating a combined color stereoscopic print produced in the above-identified manner onto the back of a lenticular screen. When the color print is viewed through a lenticular screen of the same type employed to produce the separation negatives, an illusion of stereoscopic relief is provided. Accordingly, exact registration between the viewing screen and the color print is required. As shown in FIG. 2, a composite color stereoscopic print 32 is placed onto a feed table 33 associated with a modified flat bed proofing press 34. The table 33 preferably comprises stops (not shown) along one edge thereof and a micrometer (not shown) along an edge exteding perpendicularly of the edge including the stops to assure accurate placement of the composite print onto the table 33. The color print 32 is situated on top of the table 33 such that one side edge is contiguous with the press 34. The proofing press 34, which is shown in its starting position, includes a rotatable impression cylinder 36 which is mounted on a drive shaft 38. Attached to the drive shaft 38 is a pinion gear 39 which meshes with the teeth of a rack 39a. As is conventionally practiced, when the cylinder 36 is rotated by the drive shaft 38, the cylinder rides back and forth selected distances as the result of the engagement between the gear 39 and the rack 39a. The cylinder is displaced slightly from a bearing surface 40.

Formed in the impression cylinder 36 and extending longitudinally across the surface thereof are a plurality of grippers 42 which are adapted to engage the side edge of the composite color print 32. The cylinder further includes a guide (not shown) to make certain that accurate registration occurs between the side edge of the color print 32 and the grippers 42. To mount the color print onto the cylinder 36, the color print is positioned on the feed table 33 between the stops and the micrometer until the side edge of the print is clamped by the grippers 42 and thereby secured to the impression cylinder 36. The feeding of the color print 32 into engagement with the grippers 42 of the impression cylinder 36 may be accomplished manually or automatically by any number of known and conventional paper feeds. Once the grippers 42 engage the edge of the color print 32, it can be seen that when the drive shaft 38 is activated to rotate the impression cylinder 36 in a forward direction, the printed sheet 32 will be wrapped around the periphery of the cylinder. For this reason, the diameter of the impression cylinder 36 is selected such that the circumference of the cylinder is slightly less than twice the width of the color print 32. Accordingly, after slightly more than one-half a revolution by the impression cylinder 36, the grippers 42 and the side edge of the printed sheet will be in proximity to the horizontal bearing surface 40.

The proofing press 34 further includes a carriage 44 within which the cylinder 36 freely rotates and upon which a hood 46 is mounted. Attached to the carriage 44 and extending laterally to the right side thereof, as viewed in FIG. 2, is a support bar 48 upon which is mounted a spray gun 50. A tube 52 supplies a liquid to the spray gun 50 which is a solvent for the plastic material forming the production lenticular screen to which the color print 32 is laminated. The spray gun 50 may be manually or automatically operated, as understood in the art. In this regard, the spray gun 50 is operated just prior to the engagement of the color print 32 with the lenticular screen. The hood 46 includes ventilating tubing 54 extending upwardly through the top wall of the hood for venting the fumes generated by the spray emitted by the spray gun 50.

The solvent used in the gun 50 should be non-toxic and non-flammable and preferably should have a high rate of solvent activity for the material of the screen. Preferably for a screen made of polystyrene, the solvent is trichloroethylene. Other useful solvents are methylene chloride, carbon tetrachloride, and toluene. Inasmuch as the solvent leaves no residue, this technique permits spot lamination of one or more small lenticular screens on a much larger card or sheet without contaminating the remainder of the sheet.

Also affixed to the carriage 44 and extending laterally to the left side thereof, as viewed in FIG. 2, is a bracket 55 upon which are mounted a pair of suction cups 56 and 58. As will be explained hereinbelow, the suction cups 56 and 58, which may be conventionally operated, are employed to pick up the finished color print-lenticular screen combination or lamination after the color print 32 has been laminated onto the lenticular screen. Moreover, the vacuum supplied to the suction cups 56 and 58 is terminated when the cups are above the storage area 59 such that the lamination is deposited into this area after each operational cycle.

Positioned in the horizontal bearing surface 40 and displaced a selected distance from the impression cylinder 36 when the cylinder is at a starting position is a vacuum plate 60. The vacuum plate 60 is provided with registration guides 62 between which a production lenticular screen 64 is placed. The lenticular screen 64 is the same type as the assembly screen 28 employed in the camera 18 (FIG. 1) and includes a flat rear surface 64a and a forward surface formed with a plurality of semi-cylindrical convex ribs 64b which are in contact with the vacuum plate 60. The vacuum plate 60 is positioned in the bearing surface 40 such that the distance between the starting position of the impression cylinder 36 and the vacuum plate 60 approximates the width of the color print 32. In other words, when the impression cylinder 36 is rotated by the drive shaft 38 and driven along the rack 39a to a point where the grippers 42 and the side edge of the color print 32 would otherwise pass above the surface 40, the side edge of the print 32 engages the rear surface 64a of the lenticular screen 64. The grippers 42 release the print when they engage the lenticular screen 64. In this manner, the requisite exact registration is provided between the color print 32 and the lenticular screen 64.

When the impression cylinder 36 travels to a point above the surface 40 where the spray gun 50 is above the lenticular screen 64 and prior to the engagement of the impression cylinder with the lenticular screen 64, the spray gun 50 is actuated and sprays a solvent for the plastic material forming the lenticular screen 64. When the lenticular screen 64 is sprayed with the solvent, the rear surface 64a softens and is rendered adhesive. Accordingly, when the color print 32 is rolled onto the lenticular screen 64 by the impression cylinder 36 and pressed against the lenticular screen thereby, the print 32 will be cemented to the screen 64 with the necessary registration. Because the sprayed solvent has no material body to it, overspray merely evaporates away. It can be seen, therefore, that there is no requirement for adjusting the positioning of the screen 64 on the print because the required accurate registration is provided and that there is a complete uniformity of the seal between the screen and the print.

After the impression cylinder 36 has deposited and laminated the color print 32 to the screen 64, it continues to be moved in a forward direction to a stop position. At the stop position, the suction cups 56 and 58 are positioned immediately above the lamination and are operative to pick-up the lamination from the vacuum plate 60. At this time, the drive shaft 38 is driven in a reverse direction and the impression cylinder is driven by the shaft 38 back along the rack 39a to the starting position. At the starting position, the cups 56 and 58 are momentarily rendered inoperative and the lamination is deposited into a storage area 59.

In operation, stereoscopic color pictures are prepared by taking a series of original color pictures of an object at different viewing angles with, for example, a 35 mm. motion picture camera, preferably having fixed pins registration features, and processing the exposed color film to provide the 35 mm. color transparency film strip 10. Any other type of motion picture camera may be used so long as it provides accurate registration. As shown in FIG. 1, individual color separation negatives are made by exposing a photosensitive film sheet 27 to a color component of each of the color transparencies 10a . . . 10n, through the lenticular screen 28 while the film is moved transversely a fraction of the width of one lenticule with respect to the screen as each transparency is projected by the projector 12. After each exposed film is developed to provide thereby three color separation negatives, a combined color print is prepared from the separation negatives by a suitable graphic arts process.

As shown in FIG. 2, each combined color print 32 is then loaded onto the periphery of the impression cylinder 36. When the drive shaft 38 is activated, the cylinder 36 is driven along a rack 39a immediately above the horizontal bearing surface 40. Prior to the engagement between the cylinder 36 and the lenticular screen 64 mounted on the vacuum plate 60, the spray gun 50 is operated and sprays a solvent for the screen material onto the rear surface 64a of the lenticular screen 64. The combined color print 32 is then laminated onto the rear surface 64a of the lenticular screen 64 by the impression cylinder 36 which travels to a stop position. At this position the suction cups 56 and 58 pick up the lamination from the table. After the cylinder 36 has been driven in a reverse direction to the starting position, the cups 56 and 58 are momentarily rendered inactive and the lamination is deposited into the storage area 59.

Although the invention has been described herein with reference to a specific embodiment, many modifications and variations therein will readily occur to those skilled in the art. Accordingly, all such variations and modifications are included within the intended scope of the invention as defined by the following claims.

I claim:
1. A method of laminating a stereoscopic color print onto the rear surface of a lenticular screen comprising the steps of: loading the color print onto the periphery of a rotatable impression cylinder situated above a planar bearing surface and having starting and stopping positions above different portions of the bearing surface as said impression cylinder is driven from its starting position; positioning a production lenticular screen on the bearing surface a predetermined distance between the starting and stopping positions of the impression cylinder with the lenticulated surface of the screen facing said bearing surface; rendering the smooth rear surface of the production lenticular screen adhesive; and driving the impression cylinder to its stopping position and therefore across the smooth rear surface of the lenticular screen to deposit the composite color print onto the rear surface of the lenticular screen and press the print against the lenticular screen under pressure, whereby the composite color print is laminated onto the rear surface of the production lenticular screen.

2. A method according to claim 1 comprising the further steps of:
(a) automatically removing the composite print-lenticular screen lamination from the bearing surface while the impression cylinder is located in the stopping position; and
(b) automatically depositing the lamination in a storage area when the impression cylinder is driven back to its starting position.

References Cited
UNITED STATES PATENTS

| | | | |
|---|---|---|---|
| 290,553 | 12/1883 | Edson | 156—306 |
| 2,544,478 | 2/1951 | Nadeau et al. | 156—307X |
| 3,449,158 | 6/1969 | Rowland | 156—308X |
| 2,279,825 | 4/1942 | Kaszab | 96—40UX |
| 2,297,846 | 10/1942 | Van Benschofen | 96—40X |
| 2,815,310 | 12/1957 | Anderson | 96—40X |
| 3,146,492 | 9/1964 | Lemelson | 156—384X |
| 3,161,509 | 12/1964 | Howe et al. | 96—40 |
| 3,241,429 | 3/1966 | Rice et al. | 350—131X |
| 3,332,775 | 7/1967 | Mandler | 96—40X |
| 3,420,663 | 1/1969 | Huffaker et al. | 96—40 |

DAVID KLEIN, Primary Examiner

U.S. Cl. X.R.

96—40; 350—131; 156—277, 578, 529